United States Patent [19]

Wright et al.

[11] Patent Number: 4,651,882
[45] Date of Patent: Mar. 24, 1987

[54] SYSTEM FOR STORING AND DISPENSING MAGNETIC TAPE CARTRIDGES

[75] Inventors: David M. Wright, Shrewsbury; Patrick M. Guida, Worcester, both of Mass.

[73] Assignee: Wright Line, Inc., Newton Lower Falls, Mass.

[21] Appl. No.: 739,976

[22] Filed: May 31, 1985

[51] Int. Cl.$^4$ .............................................. A47G 29/00
[52] U.S. Cl. ...................................... 211/40; 312/13; 206/387
[58] Field of Search ...................... 312/13, 14, 15, 16, 312/17; 206/387; 211/40

[56] References Cited

U.S. PATENT DOCUMENTS

| | | | |
|---|---|---|---|
| 1,349,466 | 8/1920 | McCart, Jr. | 312/13 |
| 1,352,684 | 9/1920 | Ostendorf . | |
| 2,475,495 | 7/1949 | Haag | 312/15 |
| 2,499,220 | 2/1950 | Hinsdale | 211/40 |
| 2,499,221 | 2/1950 | Hinsdale | 211/40 |
| 3,316,039 | 4/1967 | Drobny | 312/20 |
| 3,391,792 | 7/1968 | Makar | 312/13 X |
| 3,613,895 | 10/1971 | Larkin | 211/40 |
| 3,994,550 | 11/1976 | Ackeret | 312/319 |
| 4,087,138 | 5/1978 | McRae | 312/15 |
| 4,241,955 | 12/1980 | Armistead | 312/12 |
| 4,330,162 | 5/1982 | Aboussouan | 312/15 |

OTHER PUBLICATIONS

"Cartridge System Tape and Handling/Storage Equipment for the IBM 3480", A Magnetic Tape Subsystem publication of IBM, Princeton, N.J. 08540.

Primary Examiner—Carl D. Friedman
Attorney, Agent, or Firm—Hamilton, Brook, Smith & Reynolds

[57] ABSTRACT

A system for storing and dispensing a magnetic tape cartridges having a plurality of rows (10) of pivotal storage cells (14) within a frame (2) each cell has a cartridge-discharge end and a rear wall (22) at the opposite end. A support (12) is located beneath the cell and pivot means (16) are located intermediate the ends of the cell to permit the cell to pivot on the support means relative to the horizontal. Means are provided to limit the amount of pivotal movement of the cell relative to the horizontal. The center of gravity of the cell is located closer to the cartridge-discharge end than to the rear wall end. The cartridge-discharge end of the cell normally is inclined to pivot downwardly relative to the horizontal. Means (78) are provided to limit the amount of pivotal movement of the cartridge-discharge end of the cell at substantially a horizontal position. Means (15) are also provided to offer resistance to the downward pivotal movement of the rear wall end of the cell.

14 Claims, 10 Drawing Figures

SYSTEM FOR STORING AND DISPENSING MAGNETIC TAPE CARTRIDGES

FIELD OF THE INVENTION

This invention relates to storing and dispensing systems in general and more specifically to a system for storing and dispensing magnetic tape cartridges.

BACKGROUND OF THE INVENTION

For years the accepted state-of-the-art means for supplying digital magnetic tape to data processors and other users was the familiar 10½ inch reel of ferric oxide magnetic tape. The development of the IBM 3480 Magnetic Tape Subsystem which utilizes a recording medium of chromium-dioxide magnetic particles on tape contained within compact, easy to handle cartridges, is rapidly making the 10½ inch tape reels obsolete. Not only is the chromium-dioxide magnetic tape technologically better than ferric oxide tape, but being stored in specially designed cartridges which are about 4 inches by 5 inches in size compared with the 10½ inch reels has resulted in substantial space saving to users.

Libraries for tape cartridges are available in the form of conventional stationary pigeon hole stacks into which individual cartridges are slid and then removed for usage. Portable carts with pigeon holes are also available to transport a number of cartridges from the stacks to the data processing equipment.

It is one of the objects of this invention to provide a magnetic tape cartridge storing and dispensing system which is not only space economical but also adapted to dispense cartridges from a storage position to one wherein cartridges may be removed with a minimum of effort and time.

Holders or dispensers for magnetic tape cartridges, or cassettes as they are also called, are in existence today. One example is found in U.S. Pat. No. 4,087,138 to MacRay which discloses a dispensing cabinet for tape cassettes having a plurality of pigeon hole slots, each of which is provided with its own ejector to push a cassette out of its pigeon hole to a position where the cassette may be gripped by hand.

A similar pigeon hole storage device is disclosed in U.S. Pat. No. 4,330,162 to Aboussouan. Similar to the MacRay device, Aboussouan employs an individual ejector mechanism in each pigeon hole to forcibly urge the cassette from its storage position to one where it may be picked out of the pigeon hole.

Both the MacRay and Aboussouan storage means require a plurality of moving parts as well as a separate pigeon hole for each cartridge and cassette. This results in a relatively expensive device which would be cost prohibitive to large users of magnetic tape cartridges. The systems also require storage area for many large stacks holding hundreds of cartridges each.

It is another object of this invention to provide a magnetic cartridge storing and dispensing device which eliminates the need for both a pigeon hole and an ejector for each cartridge and permits the storage of a greater number of cartridges in less space.

In, commonly owned, co-pending U.S. Pat. Application of Ronald R. King and Norman C. May, Sr., Ser. No. 729,364 filed May 1, 1985, for "System For Storage and Dispensing Magnetic Tape Cartridges", there is disclosed a system wherein there are a plurality of rows of pivotal storage cells within a frame. Each cell has a cartridge-discharge end and a cartridge-abutting end opposite each other. A support is located beneath the rows of cells and extends horizontally across the frame. Pivot means are located intermediate the ends of each cell to permit it to pivot on the support means relative to the horizontal. Means are provided to limit the amount of pivotal movement of the cell relative to the horizontal. In one embodiment of the invention the center of gravity of the cell is located closer to the cartridge-abutting end than to the cartridge-discharge end so that the bottom of the cartridge-abutting end of the cell normally occupies a lower position relative to the horizontal than the cartridge-discharge end, that is, the cell and the cartridge it contains tilts downwardly to the rear of the supporting means. Means are provided to limit the amount of downward pivotal movement of both the cartridge-discharge end and the cartridge-abutting end.

To remove a cartridge from the cell, the front or cartridge-discharge end is manually tipped downwardly to expose the upper front portion of the cartridge whereby it may be picked out of the cell. After the cartridge is removed, the weight of the cell tips it rearwardly into the position it occupied when it contained the cartridge.

DISCLOSURE OF THE INVENTION

The present invention resides in a system for storing and dispensing magnetic tape cartridges. It includes a storage cell for receiving, storing, and dispensing a cartridge. The cell has a front or cartridge-discharge end and a rear wall at the opposite end. Support means are located beneath the storage cell. There are pivot means located intermediate the ends of the cell to permit the cell to pivot on the support. The center of gravity of the cell is located closer to the cartridge-discharge end than to the rear wall whereby the cartridge-discharge end of the cell normally is inclined to pivot downwardly relative to the horizontal. There are means to limit the amount of downward pivotal movement of the cartridge-discharge end of the cell at substantially a horizontal position and there are means for offering resistance to the downward pivotal movement of the rear wall end of the cell. There are means at the cartridge-discharge end of the cell to restrain the cartridge within the cell until it is intentionally removed. On the front or discharge end of the cell, there are means for accepting cartridge identifying indicia. The system includes a plurality of rows of cells in side-by-side relationship contained within a frame.

In its normal position, either with or without a cartridge contained in it, each cell occupies a substantially horizontal position. To remove a cartridge from the cell, either a cell adjacent to it or cells on either side of it, are pivoted manually against the resistance means to gain access to the desired cartridge.

The above and other features of the invention including various novel details of construction and combinations of parts will now be more particularly described with reference to the accompanying drawings and pointed out in the claims. It will be understood that the particular system for storing and dispensing magnetic tape cartridges is shown by way of illustration only and not as a limitation of the invention. The principles and features of this invention may be employed in varied and numerous embodiments without departing from the scope of the invention.

BEST MODE OF CARRYING OUT THE INVENTION

Figure 1:
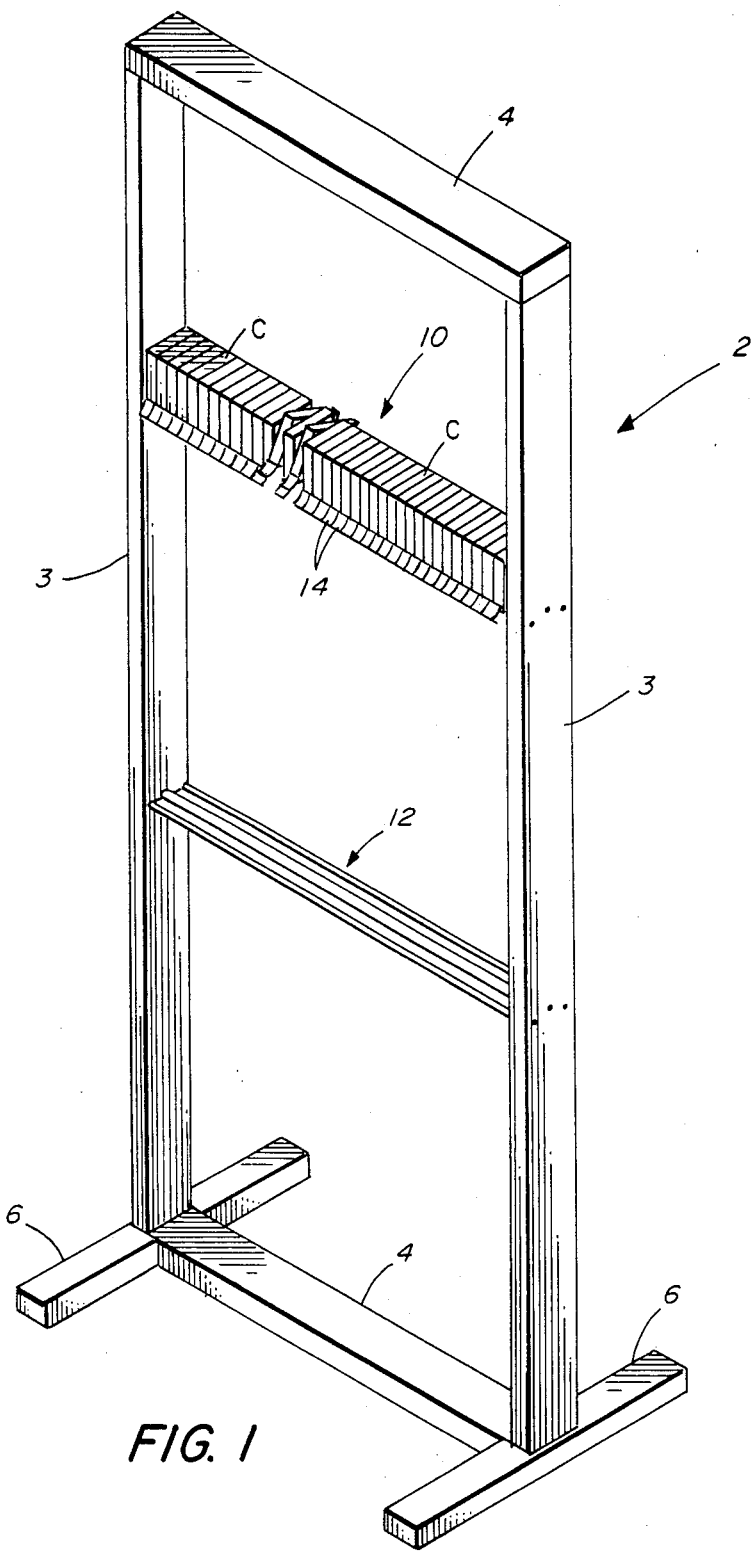
FIG. 1 is a perspective view of a library stock for storing and dispensing magnetic tape cartridges in accordance with the invention.

In FIG. 1, there will be seen a portion of a library stack in the form of a frame 2 comprising upright members 3, horizontal members 4, and supporting feet 6. It will be appreciated that the frame 2 is illustrative of not only a portion of a library stack, but also a free standing member or even the frame portions of a mobile cart which is employed for transporting cartridges C from a library to data processing equipment which will utilize the cartridges.

Cartridges are stored side-by-side in cells 14 in horizontal rows 10 only one of which is shown in FIG. 1. The cells 14 are pivotal relative to the horizontal upon support means 12 (only one of which is shown in FIG. 1). It will be understood that there are a plurality of rows 10 of support means and cells mounted within the frame 2.

Figure 2:
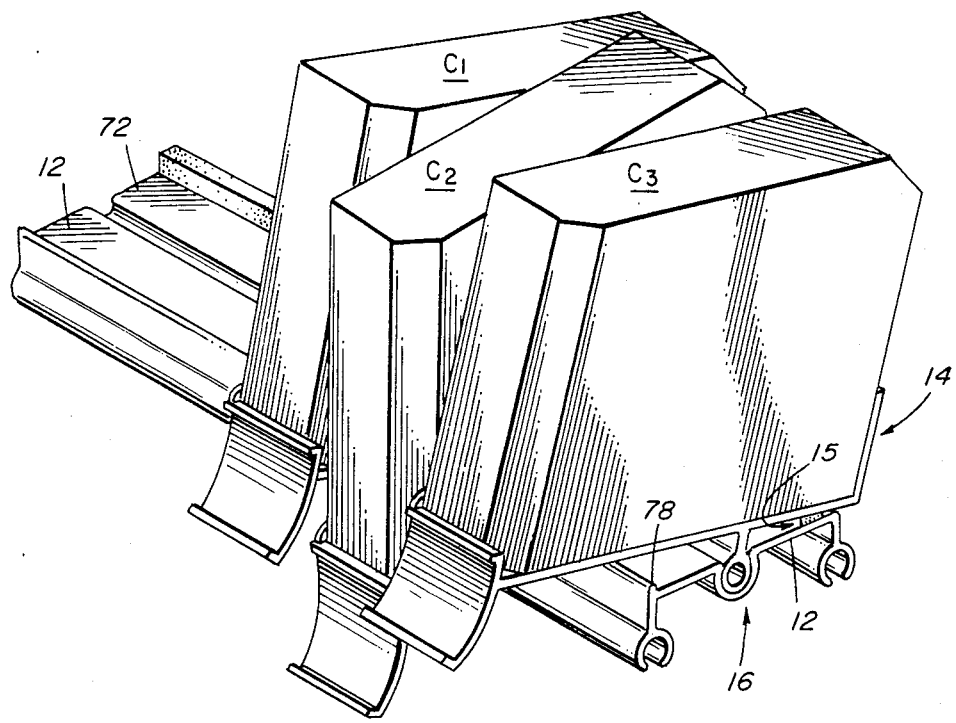
FIG. 2 is a perspective view of a partial row of magnetic tape cartridges in cells on their support means.

As seen in FIG. 2, each cartridge C is contained within its own cell 14 which is pivotal relative to the horizontal on the support means 12 by cooperative pivot means 16 which will be described in more detail hereinafter. One cartridge $C_2$ will be seen in the cartridge discharge or dispensing position which is also the cartridge storage position. The cartridge $C_2$ and the cell containing it is in substantially horizontal orientation. Cartridges $C_1$ and $C_3$ on opposite sides of cartridge $C_2$ are shown in their rearwardly tilted position, they having been tilted to this position manually against resistance means 15 in order to gain access to cartridge $C_2$ to remove it from its cell. If desired, only one cell need be tilted rearwardly to gain access to the cartridge in the next adjacent cell.

Figure 3:
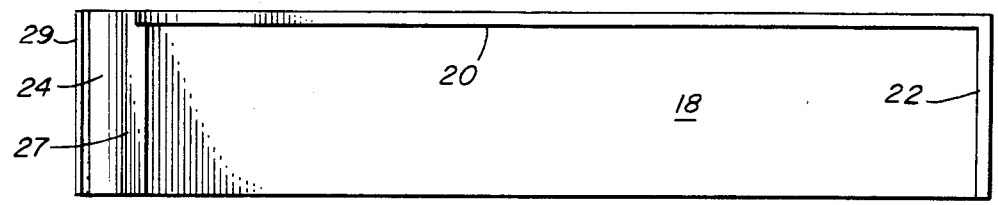
FIGS. 3 through 6 are top, side, front, and back views, respectively, of a cartridge storing and dispensing cell made in accordance with the present invention.
Figure 4:
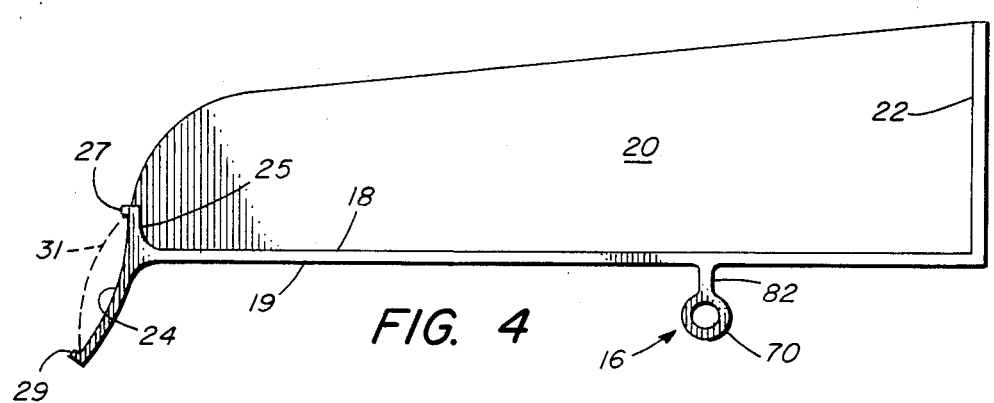
Figure 5:
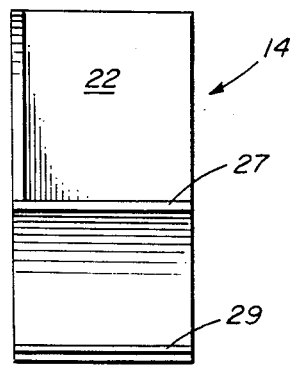
Figure 6:
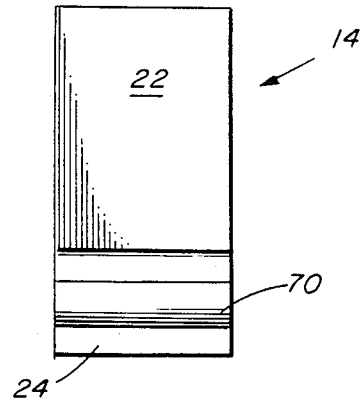

An illustrative cartridge storing and dispensing cell 14 is shown in FIGS. 3 through 6. The cell, which may be made of high impact styrene, or the like, has a flat cartridge engaging bottom 18, a bottom surface 19, a vertical side wall 20, a rear wall 22, which is located at the righthand side of the cell, as seen in FIGS. 3 and 4. The lefthand end of the cell 14 as viewed in these figures is known as the cartridge-discharge end. Located at the cartridge-discharge end of the cell is an arcuate member 24 which may be lifted by a finger to tilt the cell from its normal, substantially horizontal, cartridge storing position to the position shown by the cells holding cartridges $C_1$ and $C_3$ in FIG. 2 to gain access to the cartridge in the cell between them.

The cell includes a rib or wall 25 extending upwardly from the bottom 18 across the front of the cartridge-discharge end. This serves as a cartridge restraining means to prevent a cartridge from sliding out of the cell particularly in those instances when the invention is employed in mobile means.

A rib 27 is located at the top of the arcuate member 24. This rib assists in locating a label or decal or other cartridge identifying indicia on the arcuate member 24. A second rib 29 may, if desired, be located at the bottom of the arcuate member 24 to support, for example, a card 31 or other flexible indicia.

The pivot means 16 which is located beneath the cell may be any one of the types disclosed in co-pending application Ser. No. 729,364, as may the support means 12.

The cell 14 includes, as an example, a depending hub 70 as the male portion of the pivot means. It may be either a solid bar or a hollow bar or may assume any of the configurations disclosed in co-pending application Ser.No. 729,364.

As seen in FIG. 2, the support means 12 includes elongate members 34 with openings 32 for securing the support means 12 to the frame 2. An elongate socket 72 extends the entire length of the support means. To assemble the cells on the support means, the tubular hub portion 70 on the cell is compressed slightly and inserted into the socket 72, thereafter it is allowed to expand to the configuration shown in FIGS. 4 and 7.

The pivot limiting means or the means to support the cell in a substantially horizontal orientation is a ridge 78 running lengthwise of the support means 12 which engages the bottom surface 19 of the cell 14 when the cell is in the cartridge-discharge position, which is the same as the cartridge-storage position.

Figure 7:
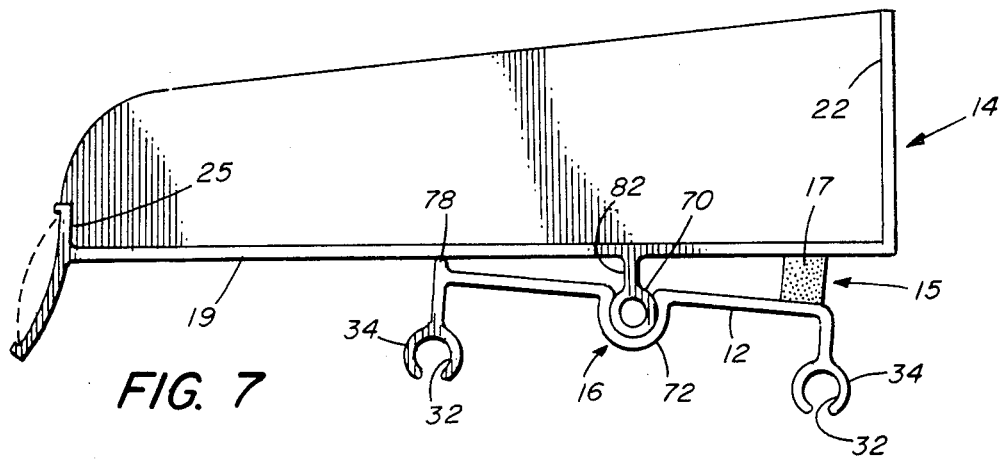
FIG. 7 is side elevation of the cell on one embodiment of the support means.

As seen in FIG. 7, the cell 14 is in a horizontal orientation with its bottom surface 19 resting on the ridge 78. Because of the relative height of the ridge 78 and the length of the arm 82 which mounts the hub 70, the plane of the support 12 is not horizontal but angled relative thereto at from approximately 4° to 8°. Thus, the support 12 would be secured within the frame members 3 at a corresponding angle. It will be noted also that the hub 70 forming the male portion of the pivot means 16 is located closer to the rear wall 22 than it is to the lefthand or cartridge-discharge end of the cell. This location, plus the presence of the arcuate member 24 and the general construction of the cell places the center of gravity closer to the lefthand or discharge end than to the rear wall 22, assuring that the normal inclination of the cell is to pivot in a counterclockwise direction as shown in FIG. 7 thereby to rest on the ridge 78.

At the righthand edge of the support 12 is located means 15 to slightly resist the pivotal motion of the cell in a clockwise direction or wherein the rear wall 22 pivots downwardly. It comprises an elastomeric member in the form of an elongate piece of compressible foam rubber 17 or the like adhesively secured to the support 12. Alternatively, individual pieces of foam rubber could be secured to the bottom 19 of the cell. When a cell is tilted backwardly, or in a clockwise direction as seen in FIG. 7, or when two cells are so tilted to gain access to the cartridge lying between them, the foam rubber 17 is slightly compressed. When the cell is released, both the weight of the cell and the compressed foam rubber tend to tilt the cell counterclockwise back into engagement with the ridge 78.

Figure 8:
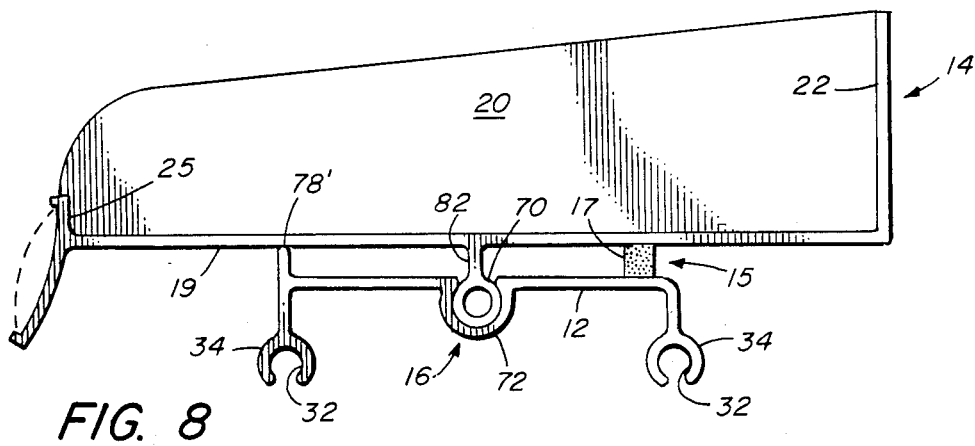
FIG. 8 is a side elevation of the cell on another embodiment of the support means.

Were it desired that both the cell and the support means be located in a horizontal orientation, the ridge 78 would be increased in height to that of the arm 82, as seen in FIG. 8 and designated 78'. This assures that the support means 12 may be secured within the frame in a horizontal orientation. Conversely, the resistance offering member would be lower in height than that shown in FIG. 7. Furthermore, with the FIG. 8 construction, the height of the compressible foam rubber 17 is the same as the rib 78. It becomes less critical that the center of gravity be closer to the discharge end of the cell. To illustrate this, FIG. 8 shows the hub 70 located further to the left than in the Fig. 7.

Figure 9:
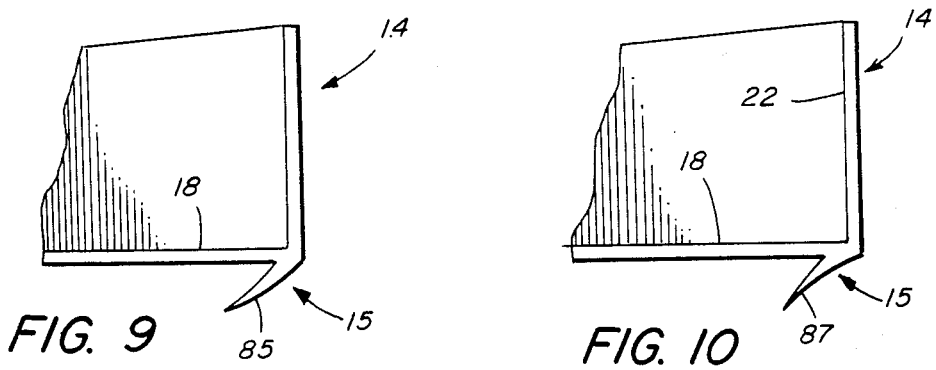
FIG. 9 is a partial side view of a cell showing one embodiment of the pivotal resistance means.
Figure 10:
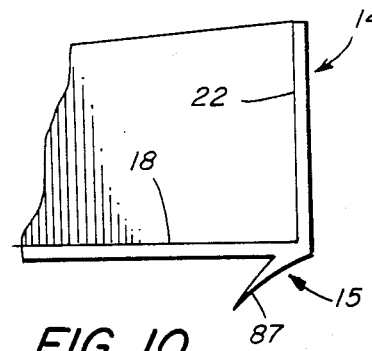
FIG. 10 is a partial side view of the cell with another embodiment of the pivotal resistance means.

Referring next to FIGS. 9 and 10, the resistance offering member 15 may be formed integral with the cell 14. In the FIG. 9 embodiment it is shown as a downwardly depending arcuate tab 85 inclined toward the left or away from the wall 22. When pivoting the cell rearwardly, the tab 85, which is flexible, would engage either the top of the support means 12 or any other fixed member such as a rib projecting from the rear wall of the frame.

FIG. 10 discloses another form of the means for offering resistance to the downward pivotal movement of the rear wall end of the cell. Like the FIG. 9 embodiment, it is a downwardly extending, flexible, arcuate projection 87 with its upper surface convex and its lower surface concave, i.e., just the opposite of that shown in FIG. 9. It, too, engages either the support means 12 or any other nonyielding member.

What is claimed is:

1. A system for storing and dispensing a magnetic tape cartridge comprising:
   a storage cell for receiving a cartridge, the cell having a front cartridge-discharge end and a rear wall at the opposite end,
   support means beneath the storage cell,
   pivot means located intermediate the ends of the cell to permit the cell to pivot on the support means relative to the horizontal,
   the center of gravity of the cell being closer to the cartridge-discharge end than to the rear wall, whereby the cartridge-discharge end of the cell normally is inclined to pivot downwardly relative to the horizontal,
   means to limit the amount of downward pivotal movement of the cartridge-discharge end of the cell at substantially a horizontal position,
   and yieldable means for offering resistance to downward pivotal movement of the rear wall end of the cell.

2. A cartridge storing and dispensing system according to claim 1 wherein there are means at the discharge end of the cell to restrain the cartridge within the cell.

3. A cartridge storing and dispensing system according to claim 1 wherein the means for limiting the amount of downward pivotal movement of the cartridge-discharge end of the cell comprises a ridge on the support means engagable with the bottom surface of the cell adjacent the cartridge-discharge end.

4. A cartridge storing and dispensing system according to claim 1 wherein there are means on the cartridge-discharge end of the cell for accepting cartridge identifying indicia.

5. A cartridge storing and dispensing system according to claim 1 wherein the means to offer resistance is a compressible elastomeric member between the bottom of the rear wall end of the cell and the support means.

6. A cartridge storing and dispensing system according to claim 1 wherein the means for offering resistance is a flexible projection extending from the rear wall end of the cell and engagable with the support means.

7. A system for storing and dispensing magnetic tape cartridges comprising:
   a plurality of storage cells for receiving one cartridge each, the cells being aligned in a row in side-by-side relationship, each cell having a front cartridge-discharge end and a rear wall at the opposite end,
   support means beneath the aligned storage cells,
   pivot means intermediate the ends of each cell to permit the cell to pivot on the support means relative to the horizontal,
   the center of gravity of each cell being closer to the cartridge-discharge end than to the rear wall whereby the cartridge-discharge end of each cell normally is inclined to pivot downwardly relative to the horizontal,
   means to limit the amount of downward pivotal movement of the cartridge-discharge end at substantially a horizontal position,
   yieldable means for offering resistance to downward pivotal movement of the rear wall end of each cell whereby any cell may be pivoted manually against the resistance mean to gain access to the cartridge contained in the next adjacent cell.

8. A cartridge storing and dispensing system according to claim 7 wherein there are a plurality of rows of cells in side-by-side relationship contained within a frame.

9. A cartridge storing and dispensing system according to claim 7 wherein there are means at the discharge end of each cell to restrain the cartridge within the cell.

10. A cartridge storing and dispensing system according to claim 7 wherein the means for limiting the amount of downward pivotal movement of the cartridge-discharge end of each cell comprises a ridge on the support means engagable with the bottom surface of each cell adjacent the cartridge-discharge end.

11. A cartridge storing and dispensing system according to claim 7 wherein there are means on the cartridge-discharge end of each cell for accepting cartridge identifying indicia.

12. A cartridge storing and dispensing system according to claim 7 wherein the means to offer resistance is a compressible elastomeric member between the bottom of the rear wall end of each cell and the support means.

13. A cartridge storing and dispensing system according to claim 7 wherein the means for offering resistance is a flexible projection extending from the rear wall end of each cell and engagable with the support means.

14. A system for storing and dispensing magnetic tape cartridges comprising:
   a plurality of storage cells for receiving one cartridge each and aligned in side-by-side relationship in a row, each cell having a front cartridge-discharge end and a rear wall at the opposite end,
   horizontally extending support means beneath the row of aligned storage cells,
   pivot means intermediate the ends of each cell to permit each cell to pivot relative to the horizontal and transversely of the support means,
   the center of gravity of each cell being closer to the cartridge-discharge end than to the rear wall, whereby the cartridge-discharge end of each cell normally is inclined to pivot downwardly relative to the horizontal,
   means to limit the amount of downward pivotal movement of the cartridge-discharge end of each cell at substantially a horizontal position,
   yieldable means for offering resistance to downward pivotal movement of the rear wall end of each cell,
   means at the discharge end of each cell to restrain the cartridge within the cell and
   means on the cartridge-discharge end of each cell for accepting cartridge identifying indicia.

* * * * *